J. HARRISON.

Illuminated Signs.

No. 6,093.

Reissued Oct. 20, 1874.

Witnesses:

A. Moraga
F. v. Briesen

Inventor:

James Harrison
by his attorney
A. v. Briesen

UNITED STATES PATENT OFFICE.

JAMES HARRISON, OF NEW YORK, N. Y.

IMPROVEMENT IN ILLUMINATED SIGNS.

Specification forming part of Letters Patent No. 57,711, dated September 4, 1866; reissue No. 6,093, dated October 20, 1874; application filed September 30, 1874.

*To all whom it may concern:*

Figure 1:
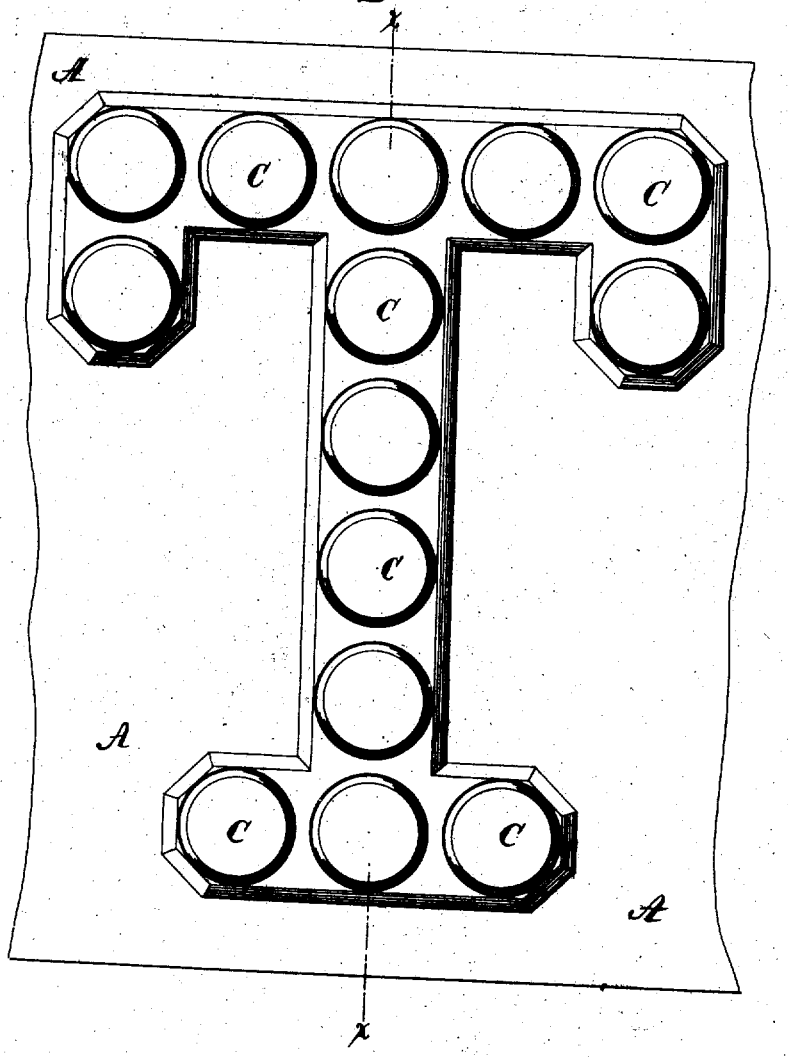
Figure 2:
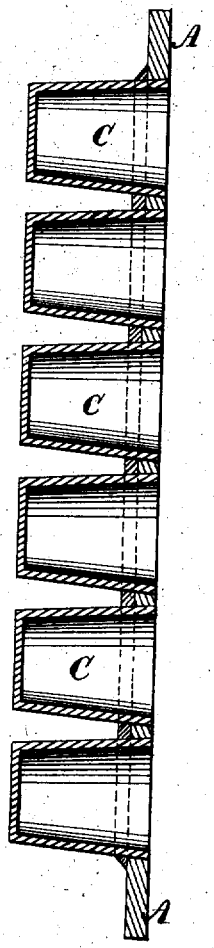

Be it known that I, JAMES HARRISON, of New York, in the county of New York and State of New York, have invented a new and useful Improvement in Illuminated Letters, Signs, &c., of which the following is a specification:

Figure 1 is a front view of a portion of a sign illustrating my invention. Fig. 2 is a vertical section of the same on the line *x x*, Fig. 1.

Similar letters of reference indicate corresponding parts in all the figures.

This invention has for its object to furnish illuminated letters, &c., on a dark background; and consists of a sign whose opaque body is perforated, the holes being filled with stopples of translucent material to represent letters or other characters, the said stopples projecting in relief from the face of the body to be perceptible at a suitable angle.

A in the drawing is the background or body of a sign, made of wood, metal, or other opaque material. This body is perforated in such a manner that the holes through it develope the letters or devices to be represented; yet the holes should be sufficiently far apart to leave the material of the body between them of the requisite strength. C C are stopples of translucent material, such as glass, and fitted through the apertures of the body A, and secured therein by suitable means in such a way that their front ends project beyond the face of the sign-body, as indicated in Fig. 2. In this manner the letters or characters formed by the translucent stopples are brought into relief, and will, especially at night when a light is placed behind the sign, be perceptible and readable at varying angles. The translucent stopples which thus constitute an illuminated relief sign on a dark ground will also serve to protect the light placed behind them from the wind, and will themselves also be protected from having the flame of the light blown against them. The stopples may be made of suitable color, or colorless.

Another advantage of my invention is, that the translucent stopples C are brought into relief on the background or body A, and the sign is consequently made legible from a distance and at varying angles, even when illuminated.

I claim as my invention—

The illuminated sign, composed of the perforated opaque body A, whose holes are filled with translucent stopples C, which project from the face of the sign, and represent the letters or characters of the sign in relief, substantially as specified.

JAMES HARRISON.

Witnesses:

A. V. BRIESEN,

F. V. BRIESEN.